(12) United States Patent
Chavez et al.

(10) Patent No.: US 8,165,773 B1
(45) Date of Patent: Apr. 24, 2012

(54) DESTINATION ARRIVAL ESTIMATES AUTO-NOTIFICATION BASED ON CELLULAR SYSTEMS

(75) Inventors: David L. Chavez, Northglenn, CO (US); Nandor Klatsmanyi, Berowra (AU); Assaph Mehr, St. Leonards (AU); Nivedita Mogale, Beaumont Hills (AU); David Shaw, Croydon Park (AU)

(73) Assignee: Avaya Inc., Basking Ridge, NJ (US)

( * ) Notice: Subject to any disclaimer, the term of this patent is extended or adjusted under 35 U.S.C. 154(b) by 1557 days.

(21) Appl. No.: 11/093,483

(22) Filed: Mar. 29, 2005

(51) Int. Cl.
*B60T 8/32* (2006.01)

(52) U.S. Cl. .......... 701/93; 701/117; 701/200; 701/209; 701/301; 701/204

(58) Field of Classification Search .................. 701/117, 701/93, 200, 209, 201, 301, 204; 340/906, 340/994
See application file for complete search history.

(56) References Cited

U.S. PATENT DOCUMENTS

| | | | | |
|---|---|---|---|---|
| 5,987,377 | A * | 11/1999 | Westerlage et al. | 701/204 |
| 6,738,698 | B2 * | 5/2004 | Ichihara et al. | 701/36 |
| 6,801,850 | B1 * | 10/2004 | Wolfson | 701/209 |
| 7,246,746 | B2 * | 7/2007 | McNamara et al. | 235/385 |
| 7,536,188 | B1 * | 5/2009 | Fegan et al. | 455/456.1 |
| 2003/0208313 | A1 * | 11/2003 | Wells et al. | 701/204 |
| 2004/0107048 | A1 * | 6/2004 | Yokota | 701/211 |
| 2004/0128066 | A1 * | 7/2004 | Kudo et al. | 701/204 |
| 2004/0267440 | A1 * | 12/2004 | DeKock et al. | 701/117 |
| 2005/0048948 | A1 * | 3/2005 | Holland et al. | 455/404.1 |
| 2005/0065719 | A1 * | 3/2005 | Khan et al. | 701/204 |
| 2006/0028352 | A1 * | 2/2006 | McNamara et al. | 340/825.49 |
| 2006/0158310 | A1 * | 7/2006 | Klatsmanyi et al. | 340/10.1 |
| 2006/0219473 | A1 * | 10/2006 | Boland et al. | 181/139 |

FOREIGN PATENT DOCUMENTS

WO    WO 01/95642 A2    12/2001

OTHER PUBLICATIONS

U.S. Appl. No. 10/911,090, filed Aug. 3, 2004, Fegan et al.
U.S. Appl. No. 10/932,507, filed Sep. 1, 2004, Fegan et al.

\* cited by examiner

*Primary Examiner* — Khoi Tran
*Assistant Examiner* — Ian Jen
(74) *Attorney, Agent, or Firm* — Sheridan Ross P.C.

(57) ABSTRACT

The present, in one embodiment, is directed to a method for determining vehicular speeds over various travel routes that includes the steps:
(a) for a plurality of mobile communication devices, determining a respective first geographic location at a first time and a second geographic location at a second later time;
(b) determining a respective velocity for each cellular communication device over the distance between the first and second geographic locations; and
(c) based on the respective velocities, providing to a driver at least one of (I) a velocity over a selected travel route, (ii) a traffic volume over the selected travel route, and (iii) an estimated time of travel over the selected travel route.

19 Claims, 3 Drawing Sheets

DESTINATION ARRIVAL ESTIMATES AUTO-NOTIFICATION BASED ON CELLULAR SYSTEMS

CROSS REFERENCE TO RELATED APPLICATION

Cross reference is made to U.S. patent application Ser. Nos. 10/911,090, filed Aug. 3, 2004, entitled "INTEGRATED REAL-TIME AUTOMATED LOCATION POSITIONING ASSET MANAGEMENT SYSTEM" and 10/932,507, filed Sep. 1, 2004, entitled "COMMUNICATION DEVICE LOCATING SYSTEM", each of which is incorporated herein by this reference.

FIELD

The invention relates generally to object tracking and particularly to object tracking using a communications network.

BACKGROUND

In many situations, it is desirable for a driver of an automobile to determine an Estimated Time of Arrival or ETA at a given location. For example, the driver may need to pick up an item, meet a person, or arrive at a location at or by a specified time. In some situations, the destination is a service provider desiring an accurate ETA to allow sufficient time to prepare an item, such as food, for the driver to pick up without having to wait. Currently, the driver must provide a best guess as to his ETA, which more often than not ultimately proves to be inaccurate. Factors such as unknown or unpredictable traffic patterns, road closures and detours, accidents, and other obstacles can cause the ETA to be grossly inaccurate.

Many types of ETA estimation systems are currently available to assist drivers. One system uses a series of traffic volume sensors or indicators positioned at selected locations on highly traveled roadways to provide drivers with estimates of traffic flow. Other systems use cameras and aircraft to provide visual estimates of traffic volume. These systems, however, commonly provide traffic information only for selected roadways and still require the driver to estimate the ETA. The traffic information can also be stale due to the delays in reporting the information to the driver coupled with the high variability of traffic volume, particularly at specific times of the day. Moreover, the ETA estimation systems commonly fail to provide continual updates to the driver as to the ETA as traffic conditions or the route traveled varies.

SUMMARY

These and other needs are addressed by the various embodiments and configurations of the present invention. The present invention is generally directed to a system and method for providing travel information, such as a velocity over a selected travel route, a traffic volume over the selected travel route, and an estimated time of travel over the selected travel route, to a requestor or another party at selected time(s).

In one embodiment, the present invention is directed to a method for determining vehicular speeds over various travel routes that includes the steps of:
  (a) for a plurality of mobile communication devices, determining a respective first physical location at a first time and a second physical location at a second later time;
  (b) determining a respective velocity for each cellular communication device over the distance between the first and second physical locations; and
  (c) based on the respective velocities, providing travel information to a driver.

In another embodiment, a system for providing an estimated time of arrival to a party is provided that includes an Estimated Time of Arrival or ETA notification agent operable to:
  (a) receive a request to provide to a party an ETA notification at a selected destination;
  (b) determine a first physical location of the selected destination;
  (c) determine a second physical location of a mobile communication device associated with the party and/or a person for whom the ETA is requested;
  (d) determine a velocity of the party and/or person for whom the ETA is requested;
  (e) determine, based on the distance between the first and second physical locations and the velocity, the ETA; and
  (f) provide the ETA notification to the party and/or the person for whom the ETA is requested.

By monitoring the movement of a number of mobile communication devices of different users, this embodiment can provide a relatively inexpensive and accurate database of travel times over selected roadways for use in predicting traffic volume(s)/speed(s) and providing Estimated Time of Arrival or ETA estimates. Because of the widespread use of cellular phones, the database can include not only historical but also current travel information. The present invention can be readily integrated with GIS-based ETA systems to provide a highly efficient architecture.

Due to privacy concerns, mobile users can be motivated to agree to being monitored by communication service discounts and/or payment(s) to participate in the system, thereby increasing the number of monitored mobile communication devices and therefore the efficiency of the system. The random movement of the owners of the mobile devices can provide an almost effortless large area scanning process. In this manner, a wide area, regional area, metropolitan area, or local area traffic monitoring network can be provided.

These and other advantages will be apparent from the disclosure of the invention(s) contained herein.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
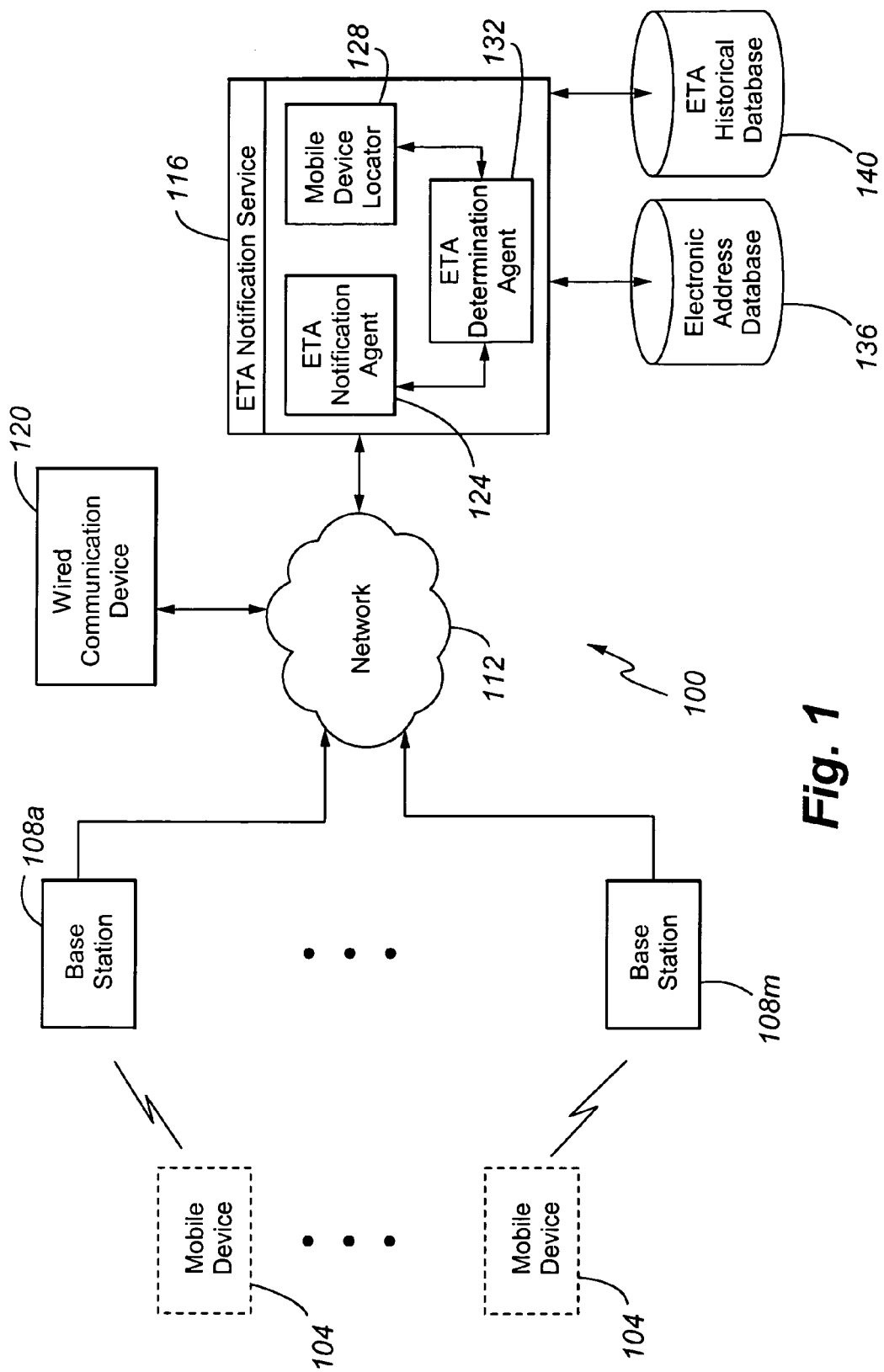
FIG. 1 is a block diagram of an ETA notification network according to an embodiment of the present invention.

FIG. 1 depicts an ETA notification network according to an embodiment of the present invention. The system 100 comprises a mobile communication device 104 in communication with a plurality of base stations 108a-m, which are turn in communication via network 112 with an ETA notification service 116. The system 100 locates the various positions of the mobile device 104 as the mobile device 104 is handed off from one base station 108 to another base station 108 along the mobile device's path of travel. The path of travel is shown by the differing depicted locations of the mobile device 104. As the mobile device is handed off base station-by-base station along the route, the base stations 108a-m to which the mobile device is handed off sequentially report the physical position of the detected mobile communication device to the ETA notification service 116 via network 112. The ETA notification service 116 can contact the mobile device 104 and/or a wired (or wireless) communication device 120 to provide periodic updates of the ETA of the user of the mobile device 104 at the physical destination location of the communication device 120.

The mobile communication device or mobile device 104 can be one or more types of mobile communication devices. Examples include cellular phones, Personal Digital Assistants or PDA's, laptops, radios, walkie-talkies, pagers, transmitter-equipped vehicles, such as police cars, fire engines, ambulances, and aircraft and the like.

Figure 2:
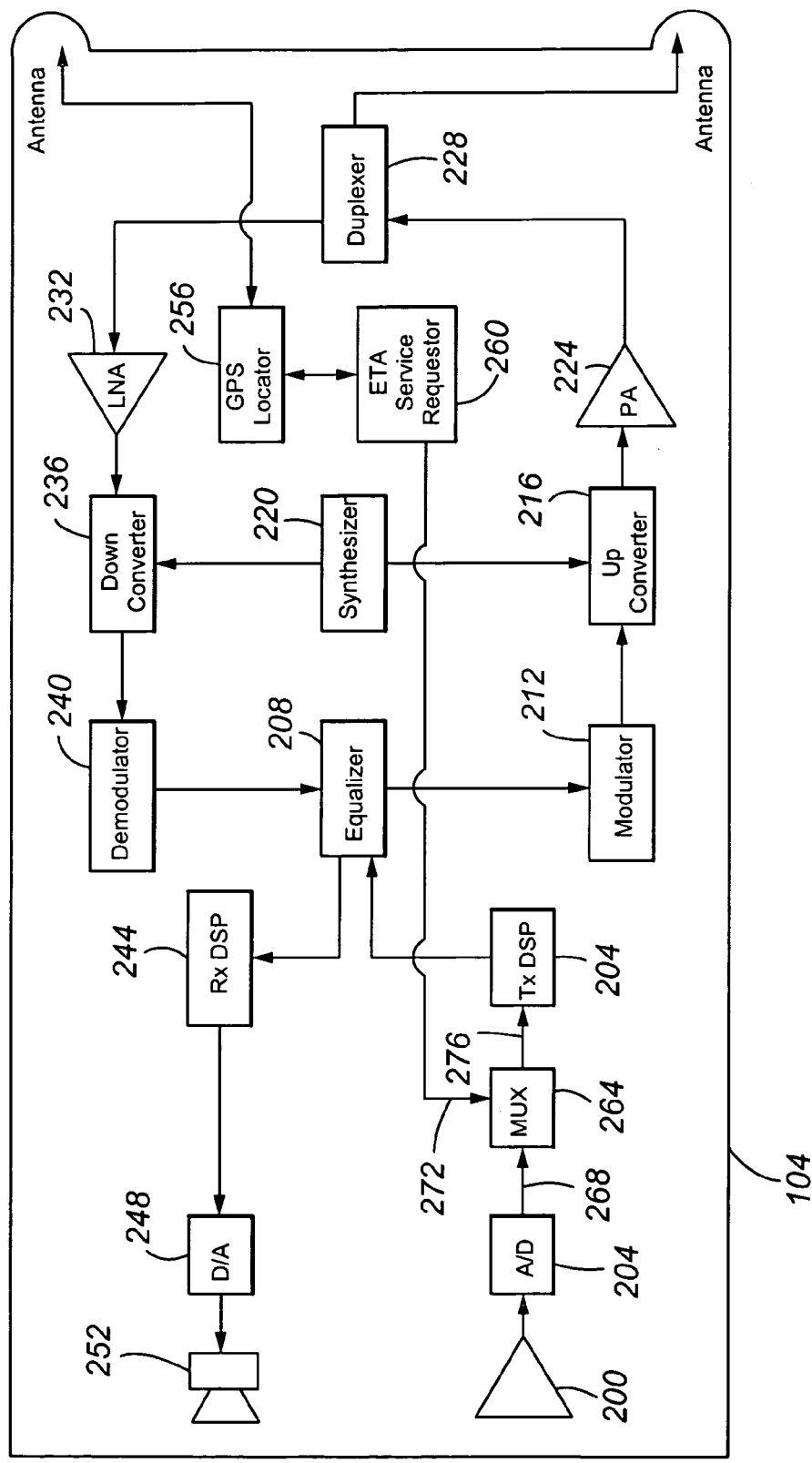
FIG. 2 is a block diagram of a mobile device according to an embodiment of the present invention.

An exemplary mobile communication device 104 is shown in FIG. 2. The device 104 is a communications device, such as a cellular telephone, that includes a microphone 200, Analog-to-Digital Converter 204 that converts the analog voice stream received from the microphone 200 into a digital voice stream, a transmitter (Tx) digital signal processor (DSP) 204 that performs speech encoding, channel encoding, and interleaving, an equalizer 208 that compensates for any frequency-dependent impairments occurring during transmission, a modulator 212 that modulates (typically in frequency or phase) the received signal, an upconverter 216 that changes the frequency of the signal, a synthesizer 220 that generates various carrier frequencies, a power amplifier 224, a duplexer 228 that acts as a double filter (one for the transmit band and one for the receive band), an antenna that sends and receives signals, a low noise amplifier 232, a down converter 236 that lowers the carrier frequency, a demodulator 240 that strips away the radio frequency leaving only a digital bit stream, a receiver (Rx) DSP 244 that performs speech and/or channel decryption and component separation of the digital bit stream, a digital-to-analog (D/A) converter 248 that converts the digital voice stream to an analog voice stream, a speaker 252 that provides the analog voice stream to the user, a Global Positioning System or GPS locator 256 and attached antenna that collectively receive current physical location information, a multiplexer 264 that combines inputs 268 and 272 into a single digital output stream 276, and an ETA service requestor 260 that, at the request of the mobile device user, generates and forwards to the ETA notification service 116 ETA notification requests and mobile device location information received from the GPS locator 256. In addition to mobile device location information, the request can include ETA notification configuration information (such as who is to be notified and at what temporal frequency and/or discrete time(s)). The ETA service requestor 260 commonly forwards the reported information to the multiplexer 264 as the input 272.

As will be appreciated, the mobile communication device's physical location information can be generated not only by GPS locator 256 on board the mobile communication device but also by a base station 108 and/or ETA notification service 116 using any conventional technique such as radio-physical location techniques (e.g., triangulation, angle of arrival, signal strength, and time-based techniques).

The reported information can be provided to the base station in a variety of different ways. The information may be transmitted as part of normal or routine signals exchanged between the mobile communication device and base station. For example, the information may be conveyed on a control channel in a system id code signal, a registration request, a call setup signal, a hand off signal, and/or another type of signal exchanged between the mobile communication device and the base station over the control channel and/or on the bearer channel during a call or when the mobile communication device is in the idle state (i.e., when the device is not receiving or making calls). For example, in CDMA 2000 when the mobile communication device is in the idle state, the base station sends the configuration system and overhead information on the PAGING channel and the communication device responds on the ACCESS channel. These messages are generally called paging and access channel messages, respectively. Typically, the message includes the current location of the mobile communication device, the ETA notification request configuration information, identification of the destination, and a time stamp. As will be appreciated, the messages will vary depending on the standard(s) in use.

Returning to FIG. 1, the base stations 108a-m can be any wireless access point, such as a cell site in a cellular, Personnel Communications Service or PCS, or Specialized Mobile Radio or SMR system, modified as set forth below. It typically includes the necessary infrastructure to enable wireless communications including a tower (not shown), antennas (not shown), cables (not shown), RF transceivers (not shown), and power supplies (not shown). The base station may communicate with the mobile communication devices using any suitable protocol, such as Advanced Mobile Telephone Service, Code Division Multiple Access, Digital Advanced Mobile Telephone Service, Digital Communication Service, Group Special Mobile, Japan Total Access Communications System, North American Digital Cellular, Nordic Mobile Telephone, Personal Communications Services, Personal Digital Cellular, Specialized Mobile Radio, Time Division Multiple Access, 1S-95, WCDMA, and Total Access Communications System.

The network 112 can be one or more wireless or wireline and circuit- or packet-switched networks, depending on the application. Typically, the network 112 comprises the Public Switched Telephone Network and/or the Internet.

Although the mobile communication device 104 is shown as being in wireless communication with the base stations, it is to be understood that the intermediate network connectivity can be any of a number of other configurations. For example, the mobile communication device can be a laptop or PDA wirelessly connected to an Ethernet port and/or including a location device such as a GPS receiver, which is in turn connected to the Internet and/or a web service (available over the Internet). The mobile communication device can be a laptop or PDA wirelessly in communication (such as via the Bluetooth™, 802.11, HiperLAN, and Digital Enhanced Cordless Telephone standards) with a wireless access point.

The ETA notification service 116 is a private or governmental service that acts not only as an ETA reporting service but also as the data repository and database updating agent for ETA information. ETA notification service 116 includes an ETA notification agent 124 (that receives ETA notification requests and configures and initiates the ETA notifications), a mobile device locator 128 (that provides the physical location of the mobile device) and an ETA determination agent 132 (that determines the current physical position of the destination and, based on the current physical positions of the mobile device and destination and other factors discussed below, the ETA).

The ETA notification service 116 further includes an electronic address database 136 and an ETA historical database 140. The electronic address database 136 includes a listing of electronic addresses (commonly telephone numbers or email addresses) with a corresponding physical location or street address associated with the electronic address. An example of the electronic address data structures is an electronic telephone directory or telephone book. The ETA historical database can include a variety of historical information such as traffic volumes and/or speeds at specific points or along certain routes at specific times of day, day of the week, and/or day of year, travel times between specific starting and ending points at specific times of day, day of the week, and/or day of year, road closures and detours, accidents, speed limits, weather conditions, and other obstacles that historically and/or currently can adversely or positively impact travel times/speeds.

The ETA notification service 116 is typically assigned a specific geographic area, such as a part of a city, county, state, province, or country.

The operation of the system will now be described with reference to FIGS. 3-5.

Figure 3:
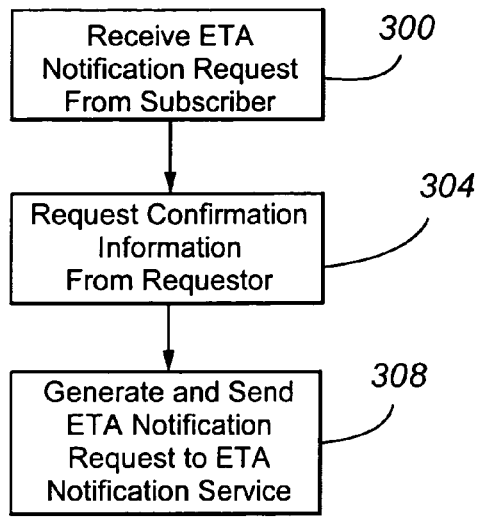
FIG. 3 is a flowchart depicting the operation of a ETA service requestor in a mobile device according to an embodiment of the present invention.

Referring to FIG. 3, the operations of the ETA service requestor 260 and GPS locator 256 in the mobile communication device 104 will be discussed.

In step 300 the operator of the mobile device 104, or subscriber to the ETA notification service, inputs a set of characters that notifies the ETA service requestor 260 of an ETA service request. The set of characters can be an alphabetical, numerical or alphanumerical character string and can be inputted by entering DTMF digits or some other character representation.

In response, the ETA service requestor 260 in step 304 requests the operator to provide predetermined types of information, such as the destination location (which may be provided by providing the electronic address of the communication device 120 at the destination), whether or not he or she is to receive the ETA notification and, if so, at what electronic address, whether or not a third party is to receive the ETA notification and, if so, at what electronic address, at what time(s) and/or frequency the ETA notification(s) is to be transmitted, and the planned course of travel or route from the operator's current location to the destination location. In one configuration, the ETA notification is provided when the ETA has an operator-specified value (e.g., 15 minutes). In another configuration, a series of ETA notifications are provided at selected time intervals until the ETA is less than a selected value (e.g., 5 minutes). In yet another configuration, the ETA notification request is made by an operator at the conclusion of a telephone call, chat session, or other live communication session with the communication device 120 at the destination. In this manner, the electronic address or telephone number of the destination can be captured and provided seamlessly to the ETA notification service 116.

In step 308, the ETA service requestor 260 requests and receives from the GPS locator 256 the current physical location of the mobile device 104 and generates and sends the ETA notification request to the ETA notification service 116 via the base station 108 and the network 112.

Figure 4:
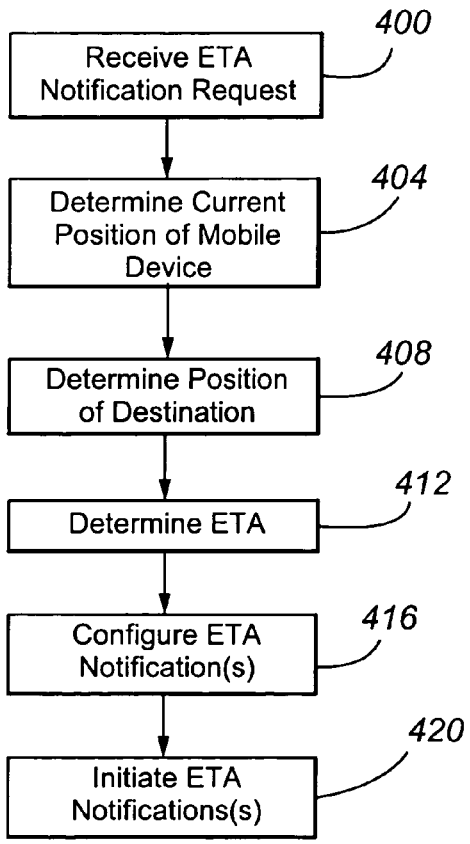
FIG. 4 is a flowchart depicting the operation of an ETA notification agent in an ETA notification service according to an embodiment of the present invention.

Referring to FIG. 4, the operations of the ETA notification agent 124, mobile device locator 128, and ETA determination agent 132 in the ETA notification service 116 will be now discussed.

In step 400, the ETA notification request is received by the ETA notification agent 124.

In response, the ETA notification agent 124, in step 404, requests the mobile device locator 128 for a current position of the mobile device 104. The mobile device locator 128 determines, from the GPS coordinates, a description of the corresponding location that is understandable by the agent 124. In one configuration, the locator 128 is unnecessary as the ETA notification agent 124 uses the GPS set of coordinates. In another configuration, the GPS locator 256 is absent from the mobile device 104 and the mobile device locator 128 determines the mobile device location from information received from base stations 108a-m by known techniques, such as triangulation, angle of arrival, signal strength, and time-based techniques. In yet another configuration, the GPS coordinates are converted into another set of coordinates corresponding to an electronic map in the memory of the ETA determination agent.

In step 408, the ETA determination agent 132 determines the position of the destination. To make this possible, the operator, in one configuration, enters a destination telephone number, electronic network address, or the some other form of electronic address. The destination location can then be determined by accessing the information in the electronic address database and mapping the electronic address received from the operator of the mobile device 104 to determine the location. The destination position is typically expressed with reference to the same points of reference as the current location of the mobile device.

In step 412, the ETA determination agent 132 determines by known techniques the operator's ETA at the destination using the current position of the mobile device 104, current position of the destination, distance along the shortest driveable route between the two locations, and estimated or actual current traffic volume and/or speed along the driveable route. In one configuration, the ETA is cumulative of a number of estimated times to travel a number of roadway segments between the two locations. The roadway segments can be provided by the requestor and/or predicted based upon the most likely route to be traveled by the requestor between the two locations. As will be appreciated, the travel time along any roadway segment is based on the estimated velocity of the requestor along that segment and the length of the segment traveled. This may be based upon the velocities of other drivers of that segment. The velocities can be determined by determining, for each driver, first and second geographic positions along the segment at first and second times, respectively, and dividing the distance between the first and second geographic positions over the time interval between the first and second times.

The ETA is provided to the ETA notification agent 124.

The ETA notification agent 124, in step 416, configures the ETA notification(s) in accordance with the requirements of the operator.

In step 420, the ETA notification(s) are initiated at the required time(s) and/or frequency. If repeated ETA notification(s) are requested, steps 404-412 and 416 are repeated at periodic intervals to provide a series of revised ETA notifications to the operator of the mobile device 104.

The ETA notification can be any form of communication, whether wired or wireless. It may be by live voice call, short message service message, instant messaging, electronic mail, and the like.

Examples will now be provided to illustrate the use of the ETA notification.

In a first example, the mobile device operator is driving an emergency vehicle, such as a police car, fire engine, ambulance, or aircraft, and the destination corresponds to a crime victim or scene, fire, accident scene, patient, or hospital, as appropriate. The operator requests an ETA notification to be provided to a specified communication device address at the destination. As the emergency travels to the destination, the ETA notification service 116 at periodic intervals revises the ETA based on current information and provides the revised ETA to the specified communication device. In this manner, the ETA is changed as the distance to the destination, traveled route, traffic conditions, and the like change. Personnel at the destination can take appropriate actions based on the ETA notifications, such as administering first aid, commencing an operation on a transplant patient awaiting delivery of an organ, entering a building at the scene of a crime in view of the imminent arrival of police backup, and the like.

In another example, the mobile device operator is driving to a restaurant for take out. The restaurant can schedule completion of the order so that the order is fresh out of the oven when the customer arrives.

In yet another example, the requestor is not the operator of the mobile device but a person at the destination. In this example, the person contacts the ETA notification service 116 and provides the necessary information to configure and generate the ETA notifications, which may be sent only to the operator of the mobile device, the person at the destination or both. The ETA notification service 116 will contact the base stations 108a-m positioned along the traveled route and/or mobile device 104 at periodic intervals to determine the current location of the mobile device 104.

In yet another example, the requestor calls from a wired telephone to request and configure the ETA notification. The requestor provides his mobile device address or number and the number of the destination. The requestor then drives his car towards the destination.

In yet a further example, the requestor calls from a wired telephone to request an ETA notification using the address associated with the number of the wired telephone as the starting point and an address associated with an inputted number associated with the destination as the ending point. This example is particularly useful where an employee is determining the commuting time to arrive at work. In one configuration, the employee can provide the ETA notification service 116 with differing travel routes to determine which has the shortest ETA.

In yet a further example, the requestor logs onto a computer and is presented with a number of differing travel routes with associated average traffic speeds depicted at differing locations along the routes. The requestor can select a route between a starting point and a given destination, such as using his mouse, and request the computer to provide an ETA. These steps can be repeated route by route until the route having the current shortest ETA is determined. Alternatively, the requestor can ask for the current shortest ETA between the two points, and the service will automatically respond with the correct answer.

A number of variations and modifications of the invention can be used. It would be possible to provide for some features of the invention without providing others.

For example in one alternative embodiment, the ETA service requestor 260, ETA notification agent 124, mobile device locator 128, and/or ETA determination agent 132 are implemented in software, hardware (e.g., a logic circuit), or a combination thereof.

In another embodiment, the base stations 108a-m along the operator's route of travel monitor the speed not only of the mobile unit 108 but also other mobile units in the area to determine average speeds along specified routes. For example, the average speed can be calculated by determining the time between hand-offs, with the time starting when a mobile device 104 is handed off by an adjacent base station to a selected base station and ended when the mobile device 104 is handed off by the selected base station to the next adjacent base station. The distance along the route traveled can then be used to determine the speed. This information can be used to determine speeds at locations between the operator's current location and the destination location and/or to build the historical database information correlating roadway location, day of week, time of day, with average monitored speed of mobile device's over a specified time interval. This historical information can be weighted, with more recent speeds being weighed more heavily than less recent speeds, in determining a single average speed for the monitored time interval to be used in ETA determinations.

In yet another embodiment, mobile devices are at both the beginning and ending points of the travel route. In other words, both the ETA requestor and the destination party are moving, typically towards one another. In that event, the ETA notification service 116 determines the locations of each party at one or more times and provides appropriate ETA notifications.

In yet another embodiment, the distance between the mobile device and a given destination location is determined by comparing the known location of the destination communication device's switch (taken from the communication device's phone number) to the mobile cell currently servicing the mobile device. Each local telephone number has two parts, namely the switch number and the extension number. The switch number is associated with a switch covering a geographical area. As will be appreciated, a cell also covers a defined geographical area.

In yet a further embodiment, the ETA notification causes a device to be activated or deactivated. For example, when the ETA is at a predetermined time, the ETA notification can turn on an air conditioner at the destination, turn-off a security system, turn-on a furnace, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for providing an estimated time of arrival to a party traveling between a first physical location and a second physical location, comprising:
    an Estimated Time of Arrival or ETA notification agent operable to:
        receive a request to provide to a party an ETA notification at a selected destination;
        determine the first physical location of the selected destination;
        determine the second physical location of a mobile communication device associated with the party for whom the ETA is requested, wherein the mobile communication device is a cellular phone in communication with a respective base station and wherein the cellular phone comprises a Global Positioning System locator operable to determine GPS coordinates for the second physical location;
        determine a velocity of travel for the party for whom the ETA is requested;
        determine the ETA based on the distance between the first and second physical locations and the velocity;
        provide the ETA notification to the party for whom the ETA is requested;
    an ETA service requestor operable to:
        interact with the party for whom the ETA is requested;
        determine an electronic address of a second communication device at the selected destination and/or time(s) at which and to whom the ETA notification is to be provided; and
    a multiplexer operable to transmit, as part of messages normally transmitted when the mobile communication device is in the idle state, at least one of (i) GPS coordinates for the second physical location; (ii) an electronic address of a second communication device at the selected destination; and (iii) a time at which the ETA notification is to be provided; and (iv) the party to whom the ETA notification is to be provided.

2. The system of claim 1, wherein the velocity is determined based on velocities of other mobile communication devices of other users over the same route of travel.

3. The system of claim 2, wherein the ETA notification agent is operable to determine the second physical location and a third physical location of the mobile communication device at first and second times, respectively; the distance between the second and third physical locations; and the velocity based on the first and second times and the distance between the second and third physical locations.

4. A system for providing an estimated time of arrival to a party traveling between a first physical location and a second physical location, comprising:
    an Estimated Time of Arrival or ETA notification means for:
        receiving a request to provide to a party an ETA notification at a selected destination;
        determining the first physical location of the selected destination;
        determining the second physical location of a mobile communication device associated with the party for whom the ETA is requested, wherein the mobile communication device is a cellular phone in communication with a respective base station and wherein the cellular phone comprises a Global Positioning System location means for determining GPS coordinates for the second physical location;
        determining a velocity of travel for the party for whom the ETA is requested;
        determining the ETA based on the distance between the first and second physical locations and the velocity;
        providing the ETA notification to the party for whom the ETA is requested;
    an ETA service requestor operable to interact with the party for whom the ETA is requested and determining the electronic address of a second communication device at the selected destination and/or time(s) at which and to whom the ETA notification is to be provided; and
    multiplexing means for transmitting, as part of messages normally transmitted when the mobile communication device is in the idle state, at least one of (i) GPS coordinates for the second physical location; (ii) an electronic address of a second communication device at the selected destination; and (iii) a time at which the ETA notification is to be provided; and (iv) the party to whom the ETA notification is to be provided.

5. The system of claim 4, wherein the velocity is determined based on velocities of other mobile communication devices of other users over the same route of travel.

6. The system of claim 5, wherein the ETA notification means is further operable to determine the second physical location and a third physical location of the mobile communication device at first and second times, respectively; the distance between the second and third physical locations; and the velocity based on the first and second times and the distance between the second and third physical locations.

7. A method for determining an ETA for a person traveling between a first physical location and a second physical location, the method comprising:
    a processor executing an Estimated Time of Arrival (ETA) notification agent:
    the Estimated Time of Arrival (ETA) notification agent receiving a request to provide to an ETA notification at a selected destination, wherein the selected destination is an electronic address of a communication device at the first physical location;
    the ETA notification agent determining the first physical location of the communication device;
    the ETA notification agent determining the second physical location of a mobile communication device associated with the party for whom the ETA is requested, wherein the mobile communication device is a cellular phone in communication with a respective base station and wherein the cellular phone comprises a Global Positioning System location means for determining GPS coordinates for the second physical location;

the ETA notification agent determining a travel distance between the first physical location and the second physical location;

the ETA notification agent determining a velocity of travel for the party along a travel route between the first physical location and the second physical location;

the ETA notification agent determining the ETA by dividing the travel distance by the velocity of travel; and the ETA notification agent providing the ETA to the party for whom the ETA is requested;

interacting with the party for whom the ETA is requested;

determining the electronic address of a second communication device at the selected destination and/or time(s) at which and to whom the ETA notification is to be provided; and transmitting, as part of messages normally transmitted when the mobile communication device is in the idle state, at least one of (i) GPS coordinates for the second physical location; (ii) an electronic address of a second communication device at the selected destination; and (iii) a time at which the ETA notification is to be provided; and (iv) the party to whom the ETA notification is to be provided.

8. The method as defined in claim 7, wherein the ETA notification agent provides a second ETA based on a third physical location of the mobile communication device, the third physical location different from the second physical location of a mobile communication device.

9. The method as defined in claim 7, wherein the selected destination is an electronic address.

10. The method as defined in claim 9, wherein the ETA notification agent determines the first physical location of the communication device by finding the electronic address in a database that lists electronic address and corresponding physical locations.

11. The method as defined in claim 9, wherein the electronic address is received at a conclusion of a live communication session.

12. The method as defined in claim 7, wherein the velocity is determined by a current traffic volume.

13. The method as defined in claim 12, wherein the velocity is over a shortest drivable route between the first physical location and the second physical location.

14. The method as defined in claim 7, wherein the velocity is an average velocity over two or more travel routes.

15. The method as defined in claim 14, wherein the travel routes are provided by the person.

16. The method as defined in claim 7, wherein the ETA is provided to a second person at the selected destination.

17. A computer readable medium having stored thereon computer-executable instructions that, when executed by a processor, cause the processor to provide an estimated time of arrival to a party traveling between a first physical location and a second physical location, the instructions comprising:

instructions to execute an Estimated Time of Arrival or ETA notification agent, the ETA notification agent including instructions to:

receive a request to provide to a party an ETA notification at a selected destination;

determine the first physical location of the selected destination;

determine the second physical location of a mobile communication device associated with the party for whom the ETA is requested, wherein the mobile communication device is a cellular phone in communication with a respective base station and wherein the cellular phone comprises a Global Positioning System location means for determining the GPS coordinates for the second physical location;

determine a velocity of travel for the party for whom the ETA is requested;

determine the ETA based on the distance between the first and second physical locations and the velocity;

provide the ETA notification to the party for whom the ETA is requested;

instructions to interact with the party for whom the ETA is requested and to determine the electronic address of a second communication device at the selected destination and/or time(s) at which and to whom the ETA notification is to be provided; and instructions to transmit, as part of messages normally transmitted when the mobile communication device is in the idle state, at least one of the (i) GPS coordinates for the second physical location; (ii) an electronic address of a second communication device at the selected destination; and (iii) a time at which the ETA notification is to be provided; and (iv) the party to whom the ETA notification is to be provided.

18. The computer readable medium of claim 17, wherein the velocity is determined based on velocities of other mobile communication devices of other users over the same route of travel.

19. The computer readable medium of claim 18, wherein the ETA notification agent further includes instructions to determine the second physical location and a third physical location of the mobile communication device at first and second times, respectively; the distance between the second and third physical locations; and the velocity based on the first and second times and the distance between the second and third physical locations.

* * * * *

UNITED STATES PATENT AND TRADEMARK OFFICE
CERTIFICATE OF CORRECTION

PATENT NO.         : 8,165,773 B1
APPLICATION NO.    : 11/093483
DATED              : April 24, 2012
INVENTOR(S)        : David L. Chavez et al.

Page 1 of 1

It is certified that error appears in the above-identified patent and that said Letters Patent is hereby corrected as shown below:

Claim 3, Column 10, line 4, replace "firstand" with --first and--.

Claim 7, Column 10, line 56, replace ":" with --;--.

Signed and Sealed this
Ninth Day of October, 2012

David J. Kappos
*Director of the United States Patent and Trademark Office*